(12) United States Patent  
Loccisano

(10) Patent No.: US 12,503,994 B2  
(45) Date of Patent: Dec. 23, 2025

(54) DUCTED TURBINE WITH PASSIVE FLAPS FOR LOAD REDUCTION

(71) Applicant: Vincent Loccisano, Wellesley, MA (US)

(72) Inventor: Vincent Loccisano, Wellesley, MA (US)

( * ) Notice: Subject to any disclaimer, the term of this patent is extended or adjusted under 35 U.S.C. 154(b) by 0 days.

(21) Appl. No.: 18/611,586

(22) Filed: Mar. 20, 2024

(65) Prior Publication Data

US 2025/0297593 A1  Sep. 25, 2025

(51) Int. Cl.
*F03D 1/04* (2006.01)

(52) U.S. Cl.
CPC .............. *F03D 1/046* (2023.08); *F03D 1/053* (2023.08); *F05B 2220/30* (2013.01); *F05B 2240/12* (2013.01)

(58) Field of Classification Search
CPC .......................... F03D 1/04–053; F03D 3/0418
See application file for complete search history.

(56) References Cited

U.S. PATENT DOCUMENTS

| | | | | |
|---|---|---|---|---|
| 4,324,985 | A * | 4/1982 | Oman | F03D 7/02 290/55 |
| 4,422,820 | A * | 12/1983 | Kirsch | F03D 1/04 415/908 |
| 2011/0103955 | A1* | 5/2011 | Desaulniers | F03D 1/04 416/183 |
| 2012/0141266 | A1* | 6/2012 | Smyth | F03D 13/20 415/213.1 |
| 2013/0195655 | A1* | 8/2013 | Kerner | F03B 3/123 416/212 A |
| 2024/0287965 | A1* | 8/2024 | Loccisano | F03D 9/25 |
| 2024/0301859 | A1* | 9/2024 | Loccisano | F03D 1/051 |
| 2025/0297593 | A1* | 9/2025 | Loccisano | F03D 1/046 |

* cited by examiner

*Primary Examiner* — Christopher R Legendre

(57) ABSTRACT

A fluid turbine has an annular-airfoil duct and passive, leading-edge flaps on the airfoil that enhance yaw stability and reduce extreme loads in excessive fluid-stream velocities when the turbine is in shutdown mode, or when it is parked or otherwise not producing power. Flaps retract and deploy passively to reduce loads by eliminating the lift over the airfoil, providing manageable loads in high-velocity flow at Up-0. The flaps are intended for use in extreme and unlikely events. Appropriate design and material selection mitigates the detrimental effects of dormancy.

5 Claims, 9 Drawing Sheets

DUCTED TURBINE WITH PASSIVE FLAPS FOR LOAD REDUCTION

TECHNICAL FIELD

The invention refers to ducted fluid turbines and more specifically to ducted fluid turbines with load-reduction mechanisms.

BACKGROUND OF THE INVENTION

Diffusor-augmented fluid turbines or ducted turbines are known in the art to increase the amount of energy that a turbine rotor can extract from a fluid stream. Ducted turbines, shrouded turbines and turbines with a ringed airfoil are each examples of a diffusor-augmented fluid turbine. Annular airfoils designed for power extraction are referred to as high-performance shrouds.

In a ducted turbine, a fluid stream contracts as it enters the duct and expands upon exit.

Energy that can be harvested from fluid is proportional to the area in front of a fluid turbine, where the non-contracted fluid stream approaches the turbine.

In a conventional diffuser-augmented turbine, a diffuser surrounding the rotor guides incoming fluid to enable the highest unit-mass flow rate proximal to the rotor plane.

Annular airfoils used in ducted fluid turbines have an inlet or leading edge, and an exit or trailing edge. The lift (suction) side of the airfoil is on the side proximal to the rotor. A fluid stream is divided into a low pressure/high-velocity stream on the interior of the airfoil, and a high pressure/lower-velocity stream on the airfoil's exterior. The higher-pressure/lower-velocity stream is referred to as the bypass flow.

To prevent flow separation from the interior of the duct, duct-augmented fluid turbines often employ bypass ducts or multi-element annular airfoils. Introducing a relatively small volume of bypass flow to the turbine wake is sufficient to maintain flow attachment over the interior surface of the duct. A mixer-ejector turbine (MET) introduces a relatively greater volume of bypass flow into the wake of the turbine to extract more energy at the rotor.

A MET that uses tandem cambered shrouds and a mixer/ejector pump improves power-generation from fluid currents. The primary shroud, which surrounds a rotor, extracts power from a primary fluid stream. Together, tandem cambered shrouds plus an ejector shroud bring more flow through the rotor than what would flow through an open rotor, creating higher flow rates and enabling increased energy extraction. The mixer/ejector pump transfers energy from the bypass flow to the rotor-wake flow by both axial and stream-wise vorticity, enabling a higher energy extraction per unit mass flow rate through the rotor. Increased flow through the rotor, combined with increased mixing, results in increased overall power production of a fluid-turbine system.

Using idealized but broadly representative models, a power coefficient based on rotor diameter increases over an open rotor by the ratio of the velocity at the location of the rotor, divided by the free-stream fluid velocity. This is measured as velocity (U) at the rotor plane (P) at power extraction factor of zero (0), referred to as UP-0.

Similarly, a rotor extracting power is measured as UP-R. The velocity of the flowing fluid (U) at the rotor plane (P) from maximum power up to the rated velocity (R) is referred to as UP-R. A turbine under operating conditions and fluid-flow velocity exhibits manageable loads under UP-R.

Airfoil-augmented rotors exhibit a proportional relation between lift over the airfoil cross-section and power extraction at the rotor. In general, an increase in lift results in an increase in power.

Under excessive fluid velocity, static pressure profiles over annular airfoils exhibit a relatively high increase at the rotor plane. This may result in a lift moment over the annular airfoil(s). An increase in lift results in increased moment forces on the turbine's structural components. The increase in moment forces results in an increase in loads under UP-0. Off-axis gusts, for example, may create an unstable yaw moment, causing oscillations through the support structure.

Following long periods of dormancy, reliable system operation can be improved by assessing the long-term environmental effects on parts and materials. Minimized complexity and appropriate material selection mitigates the detrimental effects of dormancy.

When a turbine is not aligned with the wind (referred to as at non-zero yaw), the pressures at the same locations along leading-edge cross-sections can be considerably different. Pressure differences contribute to a tendency of the turbine to move further from zero yaw; this is referred to as non-self-aligning yaw moment. Excessive fluid velocities at non-zero yaw under UP-0, combined with the unstable yaw and non-self-aligning yaw moment, are sufficient to cause excessive loads on a turbine's structural components. It is desirable to provide a means of mitigating excessive lift over annular airfoils in excessive fluid-stream velocities while not interfering with performance during normal operating conditions. Because such a system might remain dormant for long periods of time, it must be designed to avoid dormant failure.

SUMMARY OF THE INVENTION

A fluid turbine with an annular airfoil, aerodynamically coupled with a rotor and electrical-generation equipment, provides increased power extraction and efficiency over open-rotor turbines. In some embodiments, primary and secondary annular airfoils are aerodynamically coupled with a rotor and electrical-generation equipment. Hinged flaps, built onto the pressure surface of an annular airfoil, are designed to reduce loads by eliminating the lift over the airfoil, providing manageable loads in high-velocity flow at Up-0. The flaps deploy in the event of off-axis fluid streams of extreme velocity. Flaps can be designed to retract and deploy passively. In excessive fluid velocities at non-zero yaw, passively deployed flaps on annular airfoils induce stall over the inside of the shroud.

Because such a flap or flap-array is intended for extreme and unlikely events, it is expected to remain dormant for long periods. Appropriate design and material selection mitigates the detrimental effects of dormancy.

A line of measure from the leading edge to the trailing edge of an airfoil is referred to as a chord length. Example passive flaps are located on a shroud in a range within 15% along chord length, as measured from the leading edge. In height, the flaps range from 0.1% to 5% of the chord length of the airfoil.

As understood by one skilled in the art, the aerodynamic principles presented here apply to any fluid, whether liquid, gas or combination thereof. As such, aerodynamic principles of a mixer-ejector wind turbine apply to hydrodynamic principles in a mixer-ejector water turbine.

DETAILED DESCRIPTION

An improved fluid turbine that extracts power from a fluid stream has an annular airfoil that is in fluid communication with a rotor. In this disclosure "rotor" refers to any assembly in which one or more blades or blade segments are attached to a shaft and able to rotate, enabling generation or extraction of power or energy from fluid flow rotating the blade(s) or blade segments. A rotor may be conventional propeller-like rotor, a rotor/stator assembly, a multi-segment propeller-like rotor, or any relevant type of rotor understood by one skilled in the art. A "blade" in this disclosure refers to any suitable blade, including those having multiple associated blade segments.

In the context of this disclosure, a leading edge of a turbine shroud may be considered the front, and the trailing edge of a ringed airfoil may be considered the rear of the fluid turbine. A first component of the fluid turbine, located closer to the front of the turbine, may be considered "upstream" of a second, "downstream" component closer to the rear of the turbine.

In an example embodiment, a fluid turbine comprises a rotor in combination with an annular airfoil. ("Airfoil" is alternately referred to as "turbine shroud.") In one embodiment the annular airfoil comprises an annular leading-edge form that is in fluid communication with the circumference of a rotor plane. The annular leading edge transitions to a trailing edge. In some embodiments a second annular airfoil is in fluid communication with the trailing edge of the turbine shroud. The second airfoil, referred to as an ejector shroud, is coaxial with the turbine shroud. The ejector shroud may be configured as an annular airfoil. Embodiments illustrated are substantially symmetrical, but an asymmetrical configurations are within the scope of this disclosure.

Passive, leading-edge flaps enhance yaw stability and reduce extreme loads in excessive fluid-stream velocities when the turbine is in shutdown mode, or when it is parked or otherwise not producing power (including when disconnected from the power grid).

An airfoil chord length is the distance from the leading edge to the trailing edge. The leading-edge flaps are located on an airfoil between 1% and 15% of the chord length from the leading edge, and are of a height of less than 12% of the airfoil's chord length.

Figure 1:
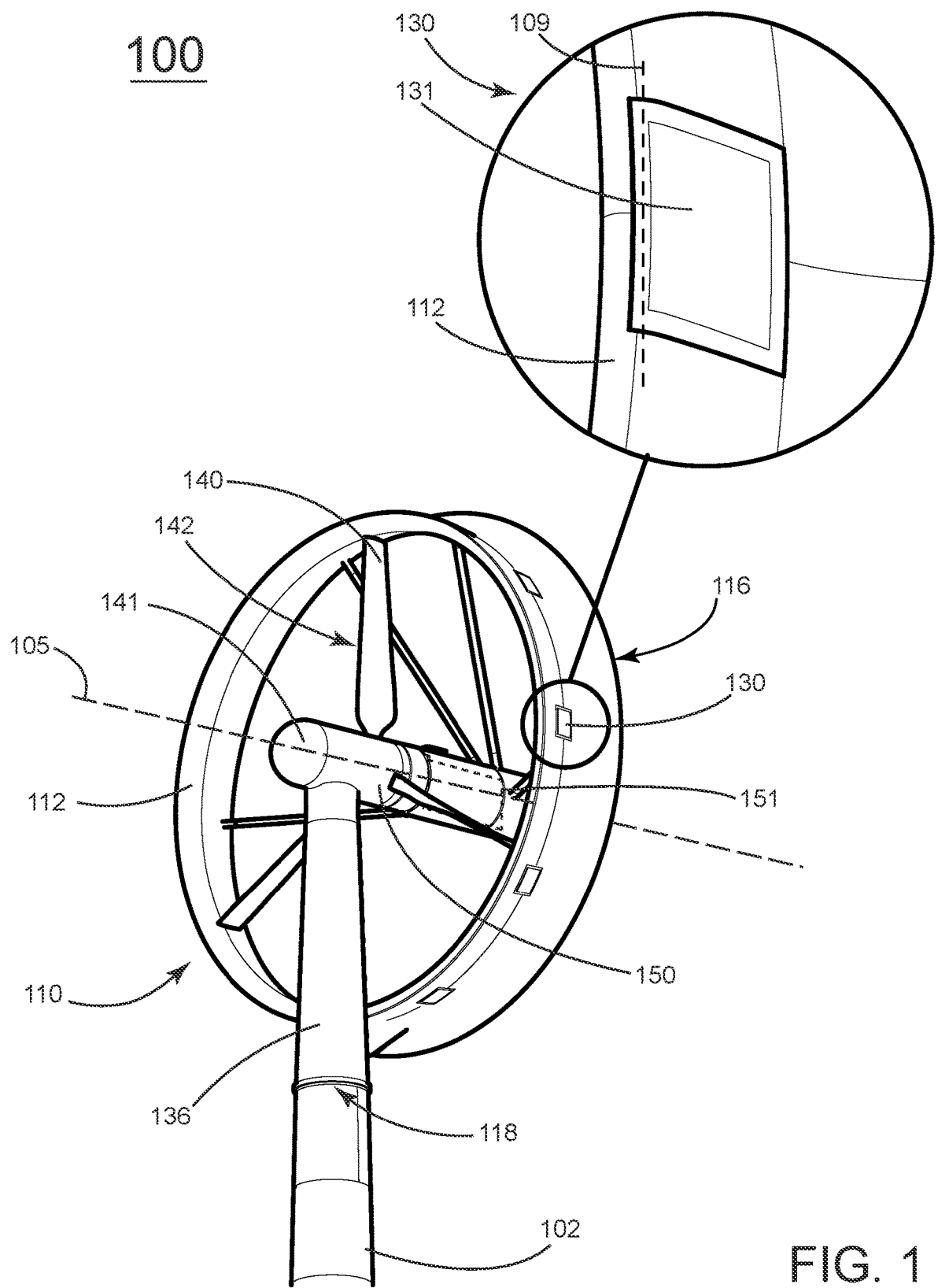
FIG. 1 is a front perspective, detail view of an example embodiment of the present disclosure.
Figure 2:
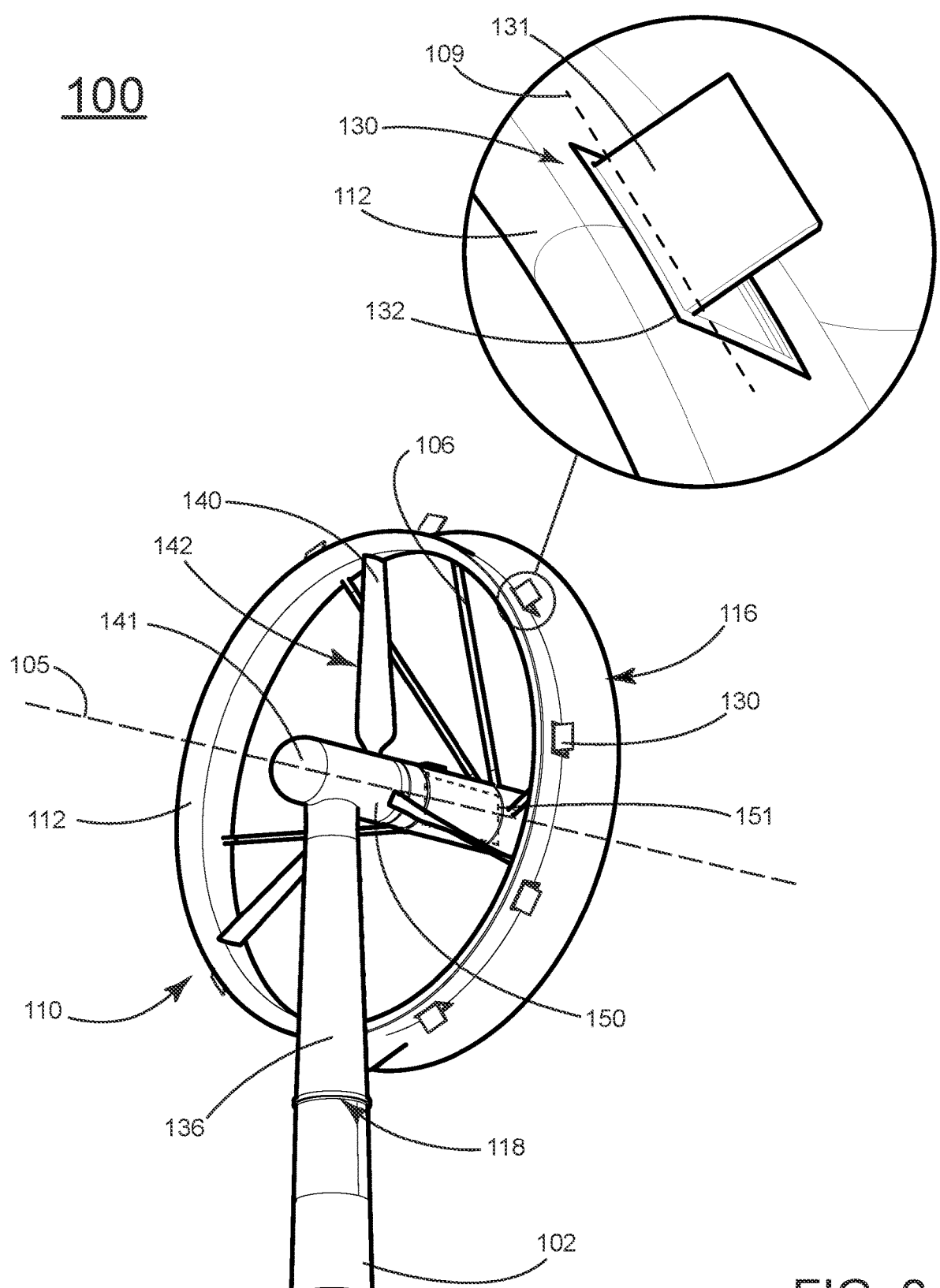
FIG. 2 is a front perspective, detail view of an example embodiment of FIG. 1.

FIG. 1 and FIG. 2 show an embodiment of the present disclosure 100, with a leading-edge flap 131 in retracted and deployed configurations respectively. The embodiment 100 comprises rotor blades 140 that are joined at a central hub 141 and rotate on a central axis 105. The hub is joined to a shaft that is coaxial with the hub and with the nacelle 150. The nacelle 150 houses electrical-generation equipment 151. A primary airfoil 110 is in fluid communication with the rotor 140 and is coaxial with the central axis 105. This airfoil 110 has a leading-edge section 112 (or "inlet end,") and a trailing edge 116 (or "exit") of the annular airfoil 110. The annular airfoil 110 is coaxial with the rotor 140, rotor hub 141 and nacelle 150 on the central axis 105. The turbine and annular airfoil is supported by a tower structure 102.

An array of flaps 130 on the airfoil's surface significantly reduces lift over the airfoil 110 and reduces loads on the airfoil and structural components. At least one flap assembly 130 is engaged with the pressure surface of the annular airfoil 110 and is located approximately between 1% and 15% along the chord length from the leading edge 112. Each flap assembly 130 has a frame 132 supporting the flap 131. Each flap 131 is pivotally engaged with the frame along an axis 109 that is substantially perpendicular to the turbine central axis 105. The flap is flush with the surface when retracted (FIG. 1) and is held shut when the fluid stream moves parallel to the turbine's central axis 105. The flap is designed to deploy in extreme fluid velocities in off-axis flows (FIG. 2).

Figure 3:
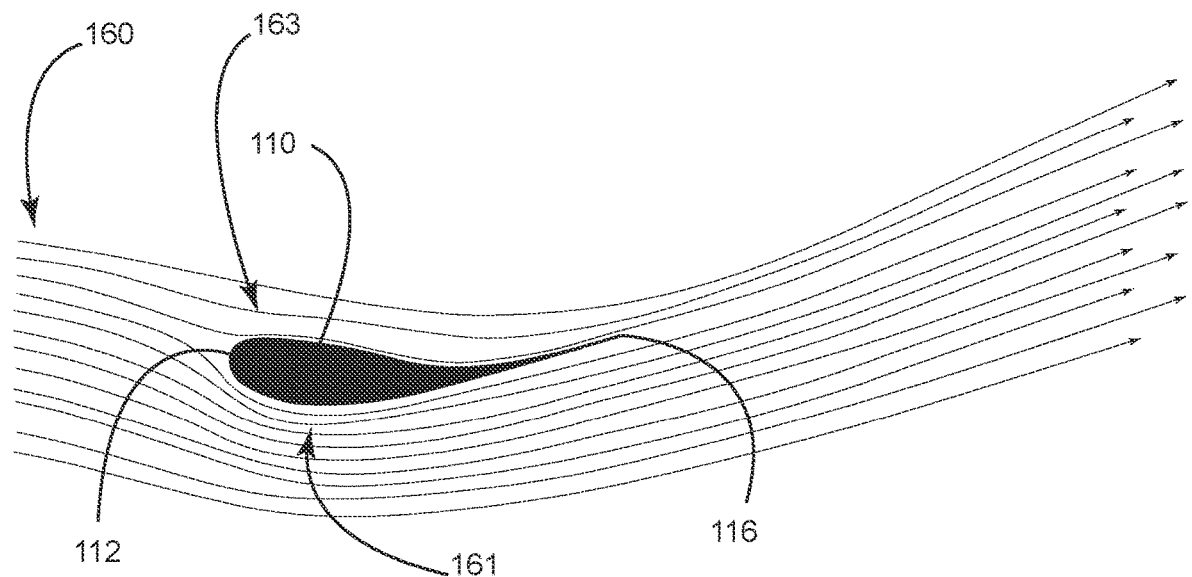
FIG. 3 is a side diagrammatic view of a shroud airfoil of the fluid turbine of FIG. 1.

FIG. 3 shows the airfoil of FIG. 1 in cross-section. A fluid stream 160 over the turbine airfoil 110 is divided into high-pressure 163 and low-pressure 161 stream at the leading edge 112. During normal operation of the ducted turbine, the low-pressure 161 stream is in fluid communication with the rotor (FIG. 1 and FIG. 2).

Figure 4:
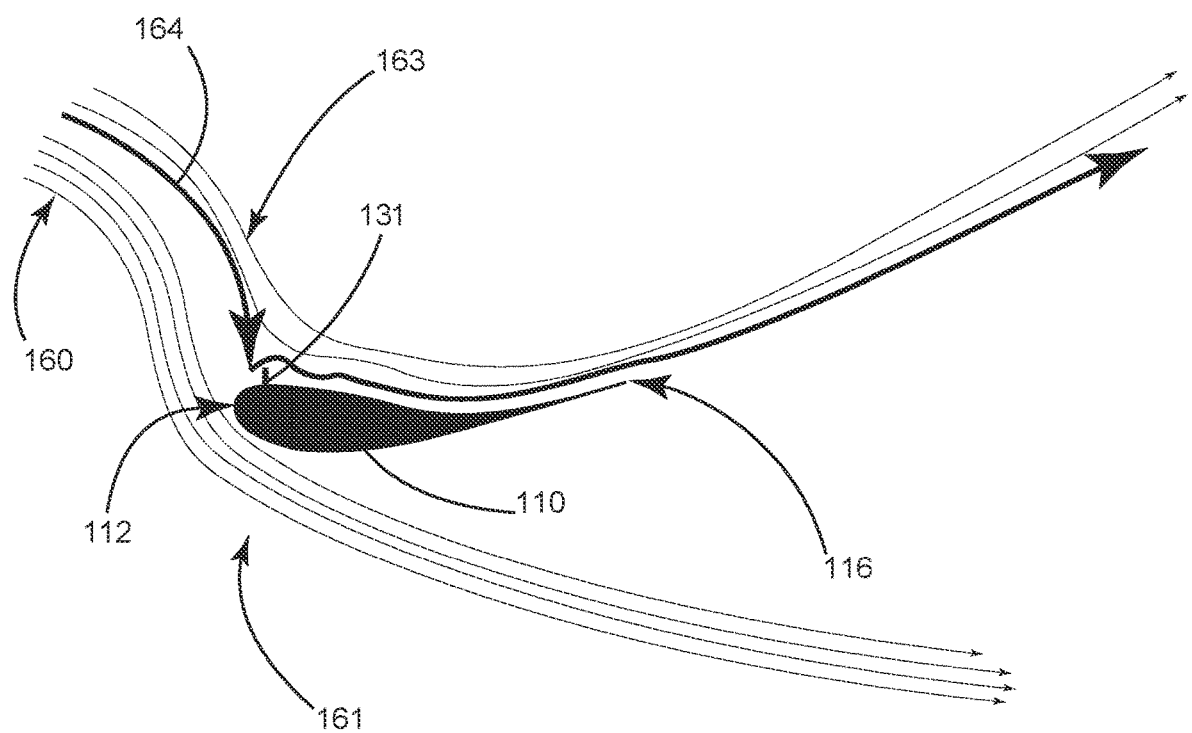
FIG. 4 is a side diagrammatic view of the shroud airfoils and a graph of the airflow during excessive fluid stream conditions at UP-0 and non-zero yaw, of the fluid turbine of FIG. 1.

FIG. 4 shows, in cross-section, the airfoil of the turbine of FIG. 1 that is at non-zero yaw under UP-0. Specifically, it depicts the coefficient of pressure along the airfoil cross-section that occurs when the turbine is greater than four degrees out of alignment with the fluid flow. One skilled in the art understands that a fluid-dynamic experiment is commonly performed with a theoretical stationary rotor that is not extracting power. The fluid stream 160 at angle of attack 164 is divided into fluid stream 163, which separates from the pressure side 161 of the airfoil 110, and fluid stream 161, which separates from the suction side of the airfoil 110, proximal to the leading edge 112.

When the pressure of the flow against the airfoil surface is substantially reduced or eliminated, i.e., when the pressure behind the flap is higher than the pressure over the flap, the flap 131 deploys. Specifically, at an angle greater than 4 degrees out of alignment, the angle of attack of the fluid stream 164 against the flap 131 results in a pressure differential that causes the flap to deploy. The deployment occurs when the yaw angle is greater than 4 degrees off axis in extreme fluid velocity. With the flap deployed, lift over the airfoil is substantially reduced.

Figure 5:
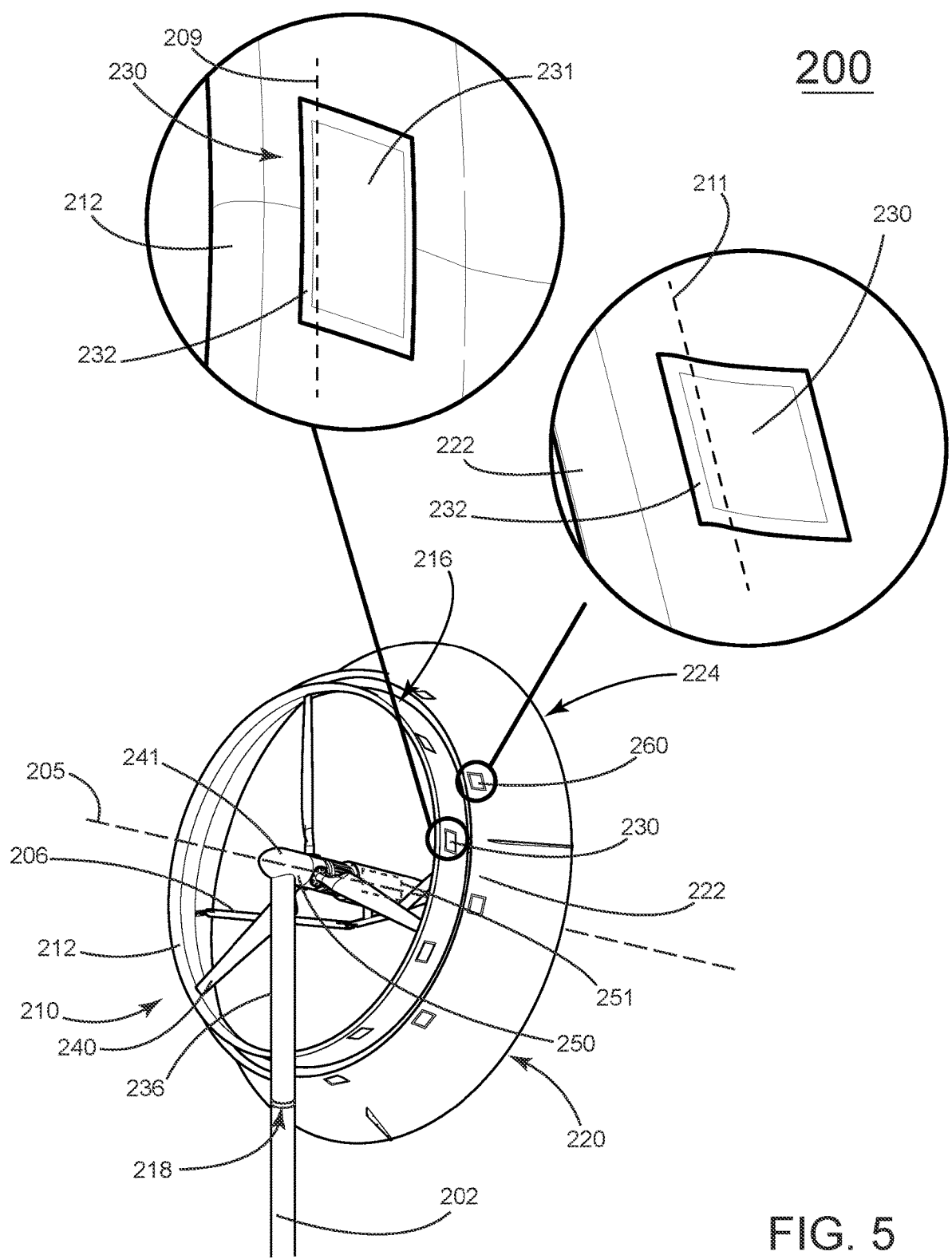
FIG. 5 is a front perspective, detail view of an example embodiment of the present disclosure.
Figure 6:
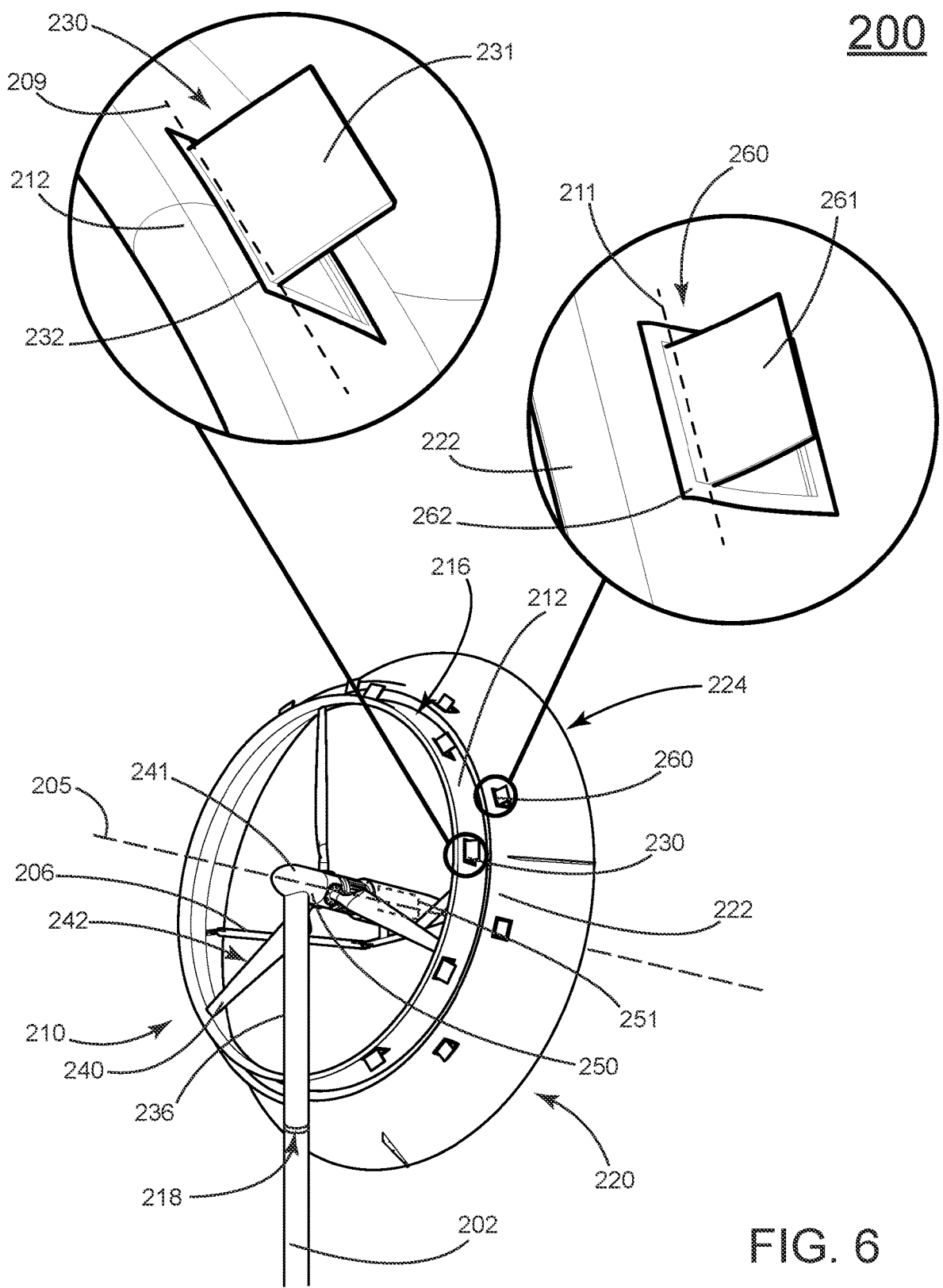
FIG. 6 is a front perspective, detail view of an example embodiment of FIG. 5.

In FIG. 5 and FIG. 6, passive, leading-edge flaps are shown in retracted and deployed configurations, respectively. The embodiment 200 comprises rotor blades 240 that are joined at a central hub 241 and rotate about a central axis 205. The hub is joined to a shaft that is coaxial with the hub and with the nacelle 250. The nacelle 250 houses electrical-generation equipment (not shown). A primary annular airfoil 210 is in fluid communication with the rotor 240 and is coaxial with the central axis 205. The annular airfoil 210 comprises a leading-edge, "inlet" section 212 and a trailing-edge, "exit" section 216.

A secondary annular airfoil 220 has leading edges 222 and trailing edges 224. The leading edge 222 is in fluid communication with the trailing edge 216 of the primary annular airfoil 210. The annular airfoils 210, 220 are coaxial with the rotor 240, rotor hub 241 and nacelle 250 on the central axis 205. The turbine and annular airfoils are supported by a tower structure 202.

An array of flaps deploy perpendicular to the turbine airfoil surface to significantly reduce lift over the airfoils and reduce loads on the airfoils and structural components. A flap assembly 230 is on the pressure surface of the turbine annular airfoil 210 and is located up to 15% along the chord length from the leading edge 212. The flap assembly 230 comprises a frame 232 that supports the flap 231.

An array of flaps, when deployed, are substantially perpendicular to the ejector 220 airfoil surface significantly reduce the lift over the airfoil and reduces loads on the annular airfoils 210/220 and structural components. At least one flap assembly 260 is engaged with the pressure surface of the ejector annular airfoil 220 and is located approximately up to 15% along the chord length from the leading edge 222. The flap assembly 260 has a frame 262 that supports the flap 261.

Flaps 231/261 are pivotally engaged with respective frames 232/262 along an axis 209/211 that is substantially perpendicular to the turbine central axis 205. The flaps are flush with respective shroud surfaces when retracted (FIG. 5) and are held shut when the fluid stream flows parallel to the turbine central axis 205. Flaps deploy in the event of an off-axis fluid stream of extreme velocity. They can be designed to retract and deploy passively to reduce loads by eliminating the lift over the airfoil, providing manageable loads in high velocity flow at Up-0 (FIG. 6).

Figure 7:
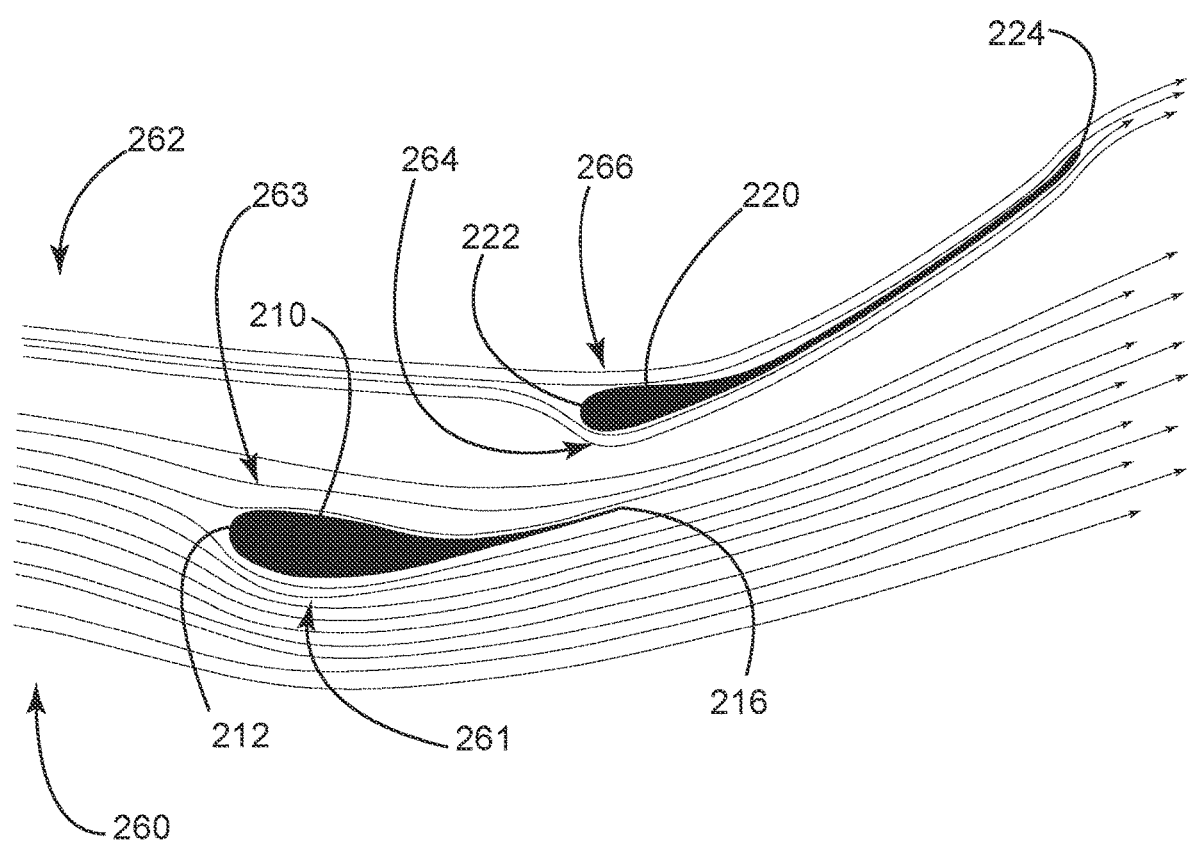
FIG. 7 is a side diagrammatic view of a set of shroud airfoils of the fluid turbine of FIG. 6.

FIG. 7 shows the shroud airfoil cross sections of the turbine of FIG. 5. The fluid stream 260 over the turbine shroud 210 is divided into a high pressure 263 and low pressure 261 stream at the leading edge 212. The fluid stream 262 high-pressure 266 and low-pressure 264 stream at the leading edge 222. During normal operation, the low-pressure 261 stream is in fluid communication with the rotor FIG. 5 and FIG. 6. A mixer-ejector turbine injects bypass flow 264 to the flow that has passed through the rotor 261 for the purpose of increasing the total pressure downstream of the rotor (this is otherwise referred to as energizing the wake), with the aim of allowing greater energy extraction at the rotor than could be extracted by an open rotor or than by a duct-augmented turbine.

Figure 8:
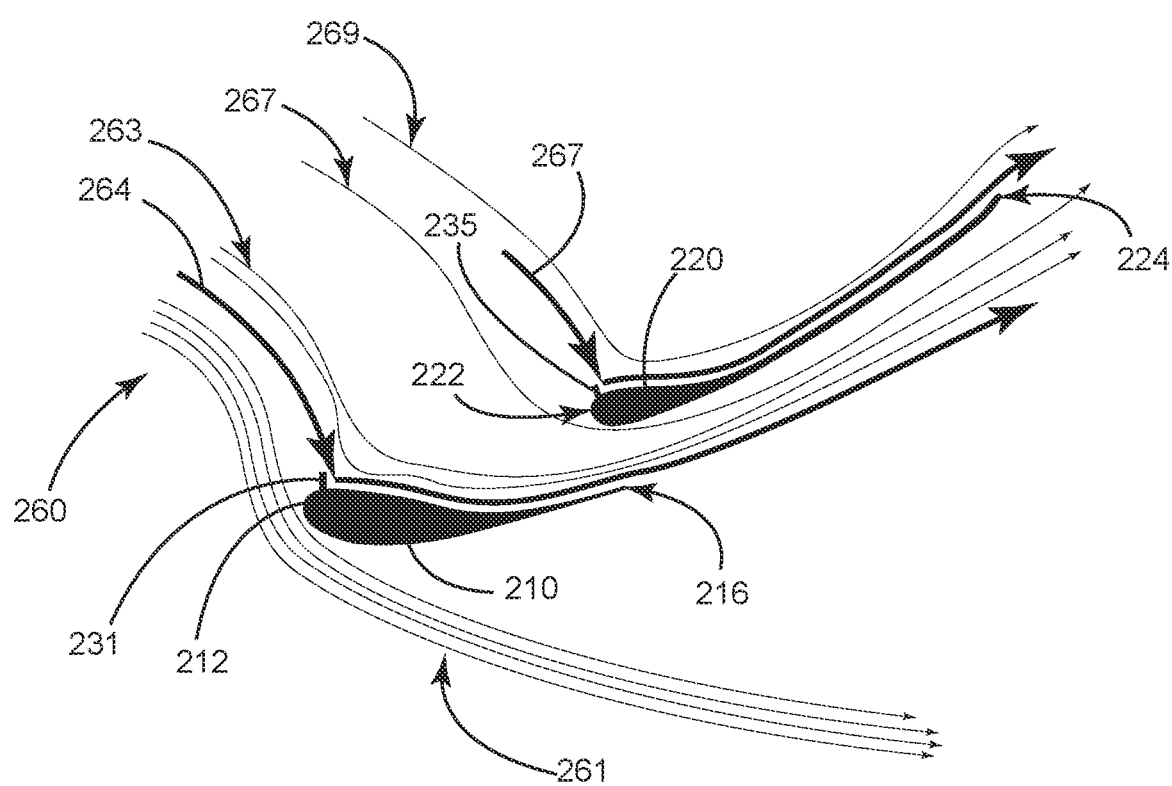
FIG. 8 is a side diagrammatic view of the shroud airfoils and a graph of the airflow during excessive fluid stream conditions at UP-0 and non-zero yaw, of the fluid turbine of FIG. 6.

FIG. 8 shows the airfoil cross sections of the turbine of FIG. 5 in which the coefficient of pressure along the airfoil cross-section occurs when the turbine is at non-zero-yaw under UP-0, or greater than four degrees out of alignment with the fluid flow. Here, a stationary rotor is not extracting power. The fluid stream 260 flows over the turbine and ejector shrouds (arrows 264 and 267 respectively), and is divided into fluid stream 263, which separates from the pressure side of the airfoil 210; and fluid stream 261, which separates from the suction side of the airfoil 210, proximal to the leading edge 212.

The fluid stream 260 is further divided into fluid stream 269, which separates from the pressure side of the ejector annular airfoil 220, and fluid stream 267, which separates from the suction side of the ejector annular airfoil 220, proximal to the leading edge 212.

The flaps 231/235 deploy when the pressure of the flow against the respective airfoil surfaces is substantially reduced or eliminated. At an angle greater than 4 degrees out of alignment, the angle of attack of the fluid stream 264/267 against flaps 231/235 respectively results in a pressure differential that causes the flaps to deploy. The flaps pop up when the pressure behind each flap is higher than the pressure over each flap, thus deploying when the yaw angle is greater than 4 degrees off axis. With the flaps deployed, lift over airfoils is substantially reduced.

Figure 9:
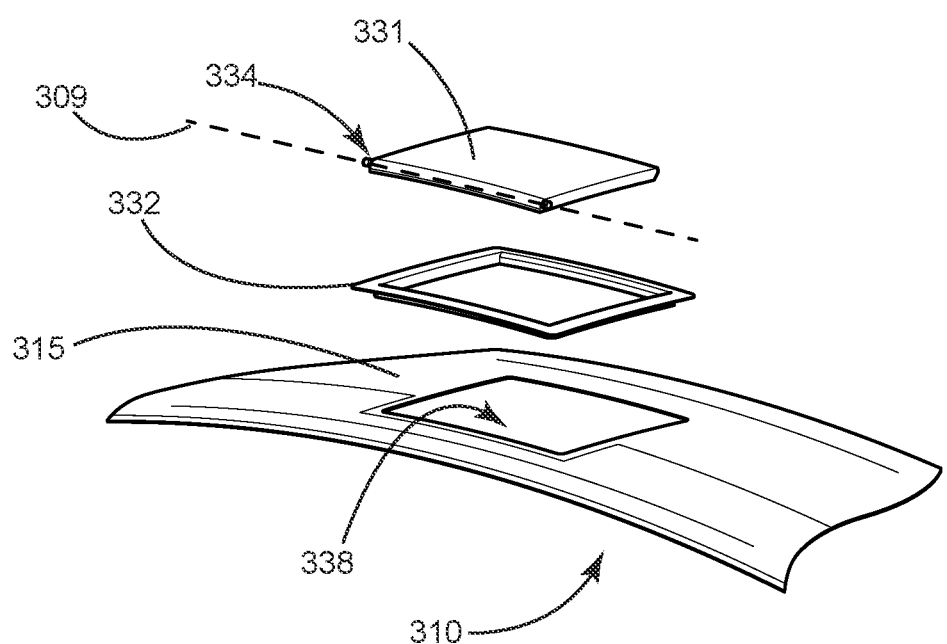
FIG. 9 is a perspective, exploded view of an example embodiment of a passive flap assembly with the flap deployed.

Referring to FIG. 9, in some embodiments a flap assembly 300 is on the pressure surface 315 of an annular airfoil 310. A void in the surface 338 receives the flap frame 332. A flap 331 comprises a hinge 334 and a pivot axis 309. The flap 331 is engaged rotatably with the frame 332 about hinge 334 and axis 309.

Passive flaps mitigate the effects of excessive velocity and off-axis flow and therefore reduce moment forces on turbine structural components. A simple mechanism that provides passive-flap deployment mitigates dormant failure.

One skilled in the art understands that passive-flow control described here may be augmented by active-flow control by employing common pressure-generating means, including mechanical or pneumatic components.

The invention claimed is:

1. A fluid turbine comprising:
a rotor mechanically coupled with a generator, rotationally engaged about a central axis; and
at least one annular airfoil surrounding said rotor and disposed about said central axis; and
said at least one annular airfoil having a lift surface and a pressure surface, a leading edge and a trailing edge, said lift surface proximal to said central axis, and said leading edge proximal to said rotor; and
at least one flap having a pivot axis that is perpendicular to said central axis; and
said at least one flap freely-movably engaged over a closed recess proximal to said leading edge and configured to passively reside flush with said pressure surface in response to a first pressure differential between the lift surface and the pressure surface created by the respective annular airfoil when a fluid stream over the respective annular airfoil is parallel to said central axis; and
said at least one flap configured to passively pivot about said pivot axis in response to a second pressure differential between the lift surface and the pressure surface created by the respective annular airfoil when an angle of attack of the fluid stream over the respective annular airfoil is greater than 4° out of alignment with said central axis.

2. The fluid turbine of claim 1 wherein:
said at least one annular airfoil having a chord length extending from said leading edge to said trailing edge; and
said at least one flap residing between 10% and 20% of the chord length from said leading edge.

3. The fluid turbine of claim 1 further comprising:
at least one void comprising said at least one closed recess.

4. The fluid turbine of claim 3 further comprising:
a frame surrounding each void.

5. The fluid turbine of claim 1 further comprising:
said at least one annular airfoil having a chord length extending from said leading edge to said trailing edge; and
said at least one flap residing at 15% of the chord length from said leading edge.

* * * * *